United States Patent
Munje et al.

(10) Patent No.: US 8,374,121 B2
(45) Date of Patent: Feb. 12, 2013

(54) METHODS AND APPARATUS FOR EFFICIENTLY ESTABLISHING AND MAINTAINING A DATA CONNECTION BETWEEN A MOBILE STATION AND A WIRELESS NETWORK

(75) Inventors: Arun Munje, Kanata (CA); Noushad Naqvi, Waterloo (CA); Jean-Philippe Cormier, Ottawa (CA); Mahmud-Ul Hassan, Kanata (CA); Thomas Leonard Trevor Plestid, Ottawa (CA); Kenneth J. Liang, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 1219 days.

(21) Appl. No.: 11/181,102

(22) Filed: Jul. 14, 2005

(65) Prior Publication Data

US 2006/0034213 A1    Feb. 16, 2006

Related U.S. Application Data

(60) Provisional application No. 60/601,418, filed on Aug. 13, 2004.

(51) Int. Cl.
*H04W 4/00* (2009.01)
(52) U.S. Cl. ........................................ 370/328
(58) Field of Classification Search ............. 370/328
See application file for complete search history.

(56) References Cited

U.S. PATENT DOCUMENTS
(Continued)

FOREIGN PATENT DOCUMENTS

| CA | 2494204 A1 | 2/2004 |
|----|-----------|--------|
| EP | 1094587 A1 | 4/2001 |

(Continued)

OTHER PUBLICATIONS

International Search Report & Written Opinion for PCT Application PCT/CA2005/001091, Nov. 16, 2005.

(Continued)

*Primary Examiner* — Steven Lim
(74) *Attorney, Agent, or Firm* — John J. Oskorep, Esq.

(57) ABSTRACT

One illustrative method for use in efficiently establishing a data connection, such as a Packet Data Protocol (PDP) Context, between a mobile station and a wireless communication network includes the steps of causing at least one data connection request to be transmitted to the wireless network in attempt to establish a data connection between the mobile station and the wireless network; setting a delay timer to an initial value and running the delay timer; if the data connection has not been established in response to transmitting the at least one data connection request, causing at least one subsequent data connection request to be transmitted after expiration of the delay timer set to the initial value; setting the delay timer to a subsequent initial value which is greater than the initial value and running the delay timer; and if the data connection has not been established in response to transmitting the at least one subsequent data connection request, causing at least one other subsequent data connection request to be transmitted after expiration of the delay timer set to the subsequent initial value. This technique continues until the data connection is established with the wireless network, if at all. If a new wireless network is selected during the technique, the process is reset such that the first initial value is again utilized first for the delay timer. Preferably, the technique works in combination with relatively more quick retries implemented in lower radio layer(s) (i.e. the physical, data link, or network layer). Thus, each data connection request may be a plurality of data connection retries which are performed much closer together in time than other retry attempts.

27 Claims, 5 Drawing Sheets

U.S. PATENT DOCUMENTS

| | | |
|---|---|---|
| 6,345,180 B1 | 2/2002 | Reichelt |
| 6,385,451 B1 * | 5/2002 | Kalliokulju et al. .......... 455/437 |
| 6,427,072 B1 | 7/2002 | Reichelt |
| 6,501,947 B1 | 12/2002 | Hunzinger et al. |
| 6,507,577 B1 * | 1/2003 | Mauger et al. ................ 370/356 |
| 6,810,263 B1 * | 10/2004 | Cheng et al. .................. 455/510 |
| 2001/0048686 A1 * | 12/2001 | Takeda et al. ................. 370/401 |
| 2002/0002041 A1 * | 1/2002 | Lindgren et al. .............. 455/404 |
| 2002/0054596 A1 * | 5/2002 | Sengodan ................ 370/395.21 |
| 2002/0082032 A1 * | 6/2002 | Hunzinger .................... 455/510 |
| 2002/0111138 A1 | 8/2002 | Park |
| 2003/0012222 A1 * | 1/2003 | Rinchiuso .................... 370/468 |
| 2003/0195966 A1 * | 10/2003 | Fujii ............................. 709/228 |
| 2003/0210649 A1 | 11/2003 | Bondi et al. |
| 2004/0053573 A1 | 3/2004 | Karusawa |
| 2004/0106378 A1 * | 6/2004 | Kim et al. .................... 455/41.2 |
| 2004/0215794 A1 * | 10/2004 | Lauer ............................ 709/230 |
| 2005/0021770 A1 * | 1/2005 | Helm et al. ................... 709/228 |

FOREIGN PATENT DOCUMENTS

| | | |
|---|---|---|
| JP | 09107393 A2 | 4/1997 |
| WO | 0147142 A1 | 6/2001 |

OTHER PUBLICATIONS

"Data Service Options for Spread Spectrum Systems", TIA Interim Standard, Feb. 2003, pp. 1-1 to 4-1, Telecommunications Industry Association, Arlington VA., USA.

3GPP2 C.S0017-009-A, "Data Service Options for Spread Spectrum Systems: High Speed Packet Data Services", Jun. 11, 2004, 1-1 to 4-1, Version 1.0, 3rd Generation Partnership Project 2(3GPP2).

International Preliminary Report on Patentability for PCT Application # PCT/CA2005/001091, Dated Feb. 13, 2007.

Extended EP Search Report and Written opinion for Application # 05763564.1, Dated Jul. 19, 2007.

* cited by examiner

METHODS AND APPARATUS FOR EFFICIENTLY ESTABLISHING AND MAINTAINING A DATA CONNECTION BETWEEN A MOBILE STATION AND A WIRELESS NETWORK

CROSS-REFERENCE TO RELATED APPLICATION

The present application claims priority to U.S. Provisional Patent Application entitled "Methods And Apparatus For Efficiently Establishing And Maintaining A Data Connection Between A Mobile Station And A Wireless Network" having application No. 60/601,418 and a filing date of 13 Aug. 2004, which is hereby incorporated by reference herein.

BACKGROUND

1. Field of the Technology

The present invention relates generally to mobile stations operating in wireless communication networks which establish and maintain data connections, such as Packet Data Protocol (PDP) Contexts, to facilitate data communications.

2. Description of the Related Art

A wireless communication device, such as a mobile station operating in a wireless communication network, may provide for both voice telephony and packet data communications. A mobile station may, for example, be compatible with $3^{rd}$ Generation (3G) communication standards (such as IS-2000 Release 0) and utilize Global System for Mobile Communications (GSM), Time Division Multiple Access (TDMA), or Code Division Multiple Access (CDMA) wireless network technologies.

Data communications may be facilitated between the mobile station and the wireless network over an established data connection. The data connection may involve both an "attachment" and a "Packet Data Protocol (PDP) Context" between the wireless device and the network. In general, an "attach" means that the wireless device is registered to the network. An attach also allows for mobility (i.e. the network is able to track the wireless device's movements). Furthermore, the wireless device is authenticated and ciphering is enabled. When "PDP Context" is activated, an IP address is assigned for the wireless device and subscriber-related parameters are provided so that data can be communicated. When a data application on the wireless device is activated, for example, a PDP Context between the between the wireless device and the network is established. When the application is terminated, the PDP Context ends but the wireless device still remains registered to the wireless network.

While the wireless device is operating in a wireless network, however, the PDP Context may fail within the network. When the PDP Context fails, an end user typically attempts to establish a new data connection manually via the user interface. If continual repeated retries for re-establishing the PDP Context were performed by the mobile station, they would unduly overload the wireless network. It is important to maintain a reliable "always-on" connection for data communication without overburdening the wireless network.

Accordingly, what are needed are methods and apparatus for use in efficiently establishing and maintaining a data connection between a mobile station and a wireless communication network.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

One illustrative method for use in efficiently establishing a data connection between a mobile station and a wireless communication network includes the steps of causing at least one data connection request to be transmitted to the wireless network in attempt to establish a data connection between the mobile station and the wireless network; setting a delay timer to an initial value and running the delay timer; if the data connection has not been established in response to transmitting the at least one data connection request, causing at least one subsequent data connection request to be transmitted after expiration of the delay timer set to the initial value; setting the delay timer to a subsequent initial value which is greater than the initial value and running the delay timer; and if the data connection has not been established in response to transmitting the at least one subsequent data connection request, causing at least one other subsequent data connection request to be transmitted after expiration of the delay timer set to the subsequent initial value. This technique continues until the data connection is established with the wireless network, if at all. If a new wireless network is selected during the technique, the process is reset such that the first initial value is again utilized first for the delay timer. Preferably, the technique works in combination with relatively more quick retries implemented in lower radio layer(s) (i.e. the physical, data link, or network layer). Thus, each data connection request may be a plurality of data connection retries which are performed much closer together in time than the above-described attempts.

Figure 1:
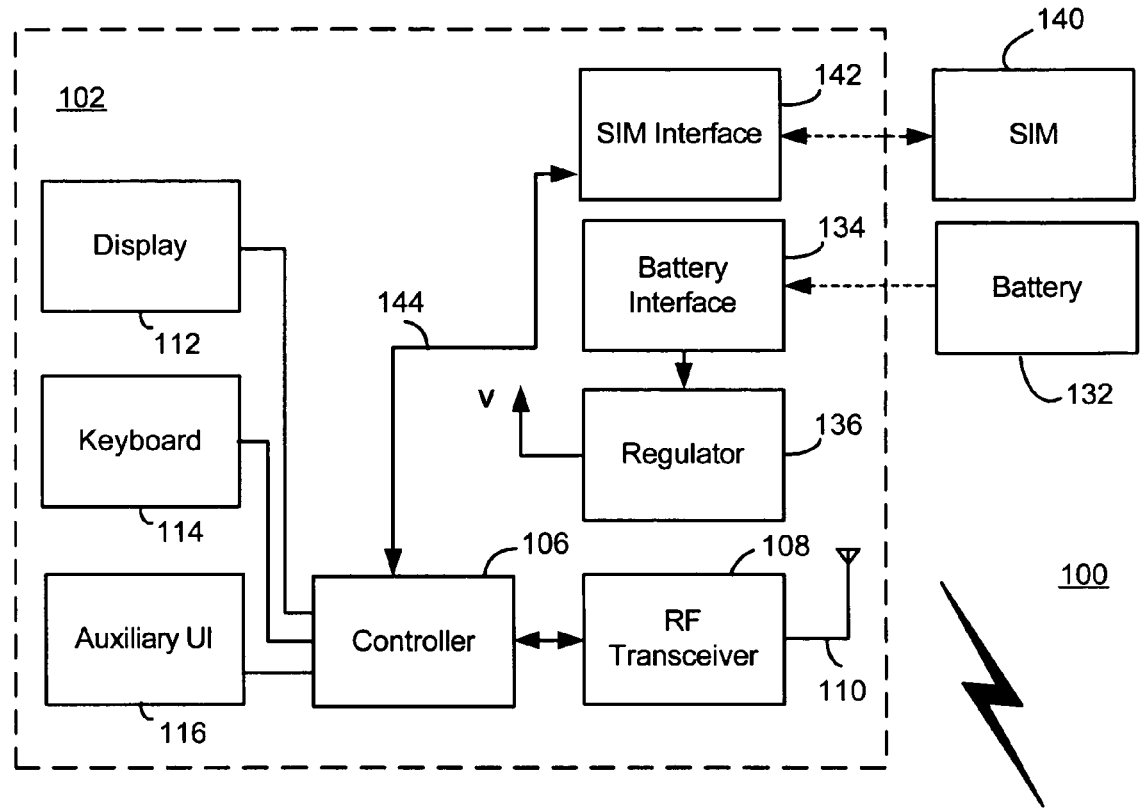
FIG. 1 is a block diagram which illustrates pertinent components of a mobile station and a wireless communication network.
Figure 1:
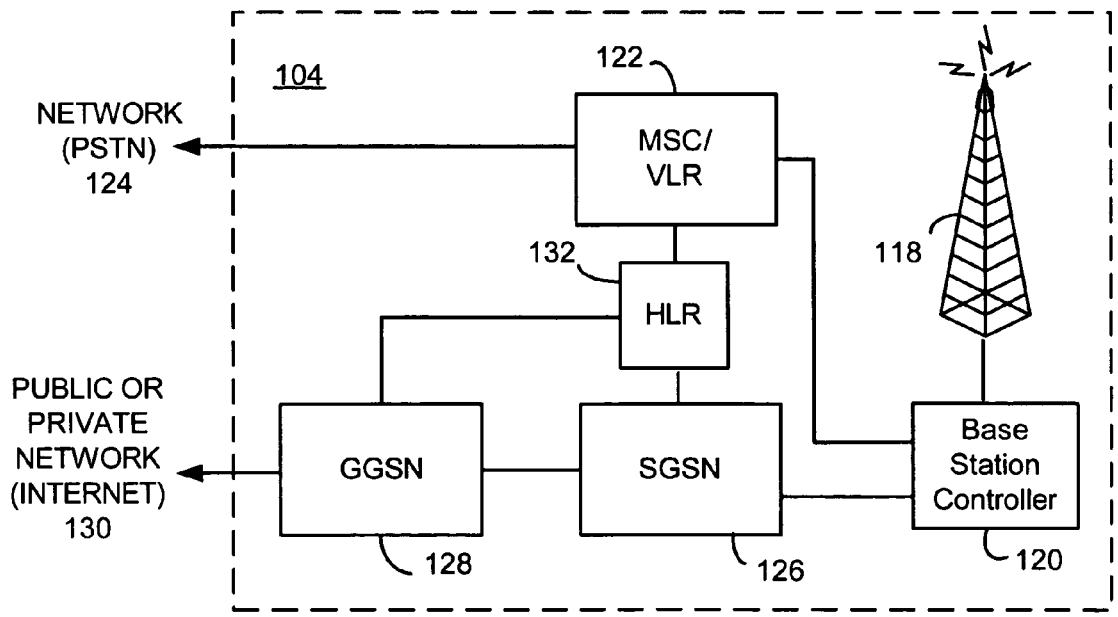

FIG. 1 is a block diagram of a communication system 100 which includes a mobile station 102 (one type of wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 132 provides for a mechanical and electrical connection for battery 132. Battery interface 132 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
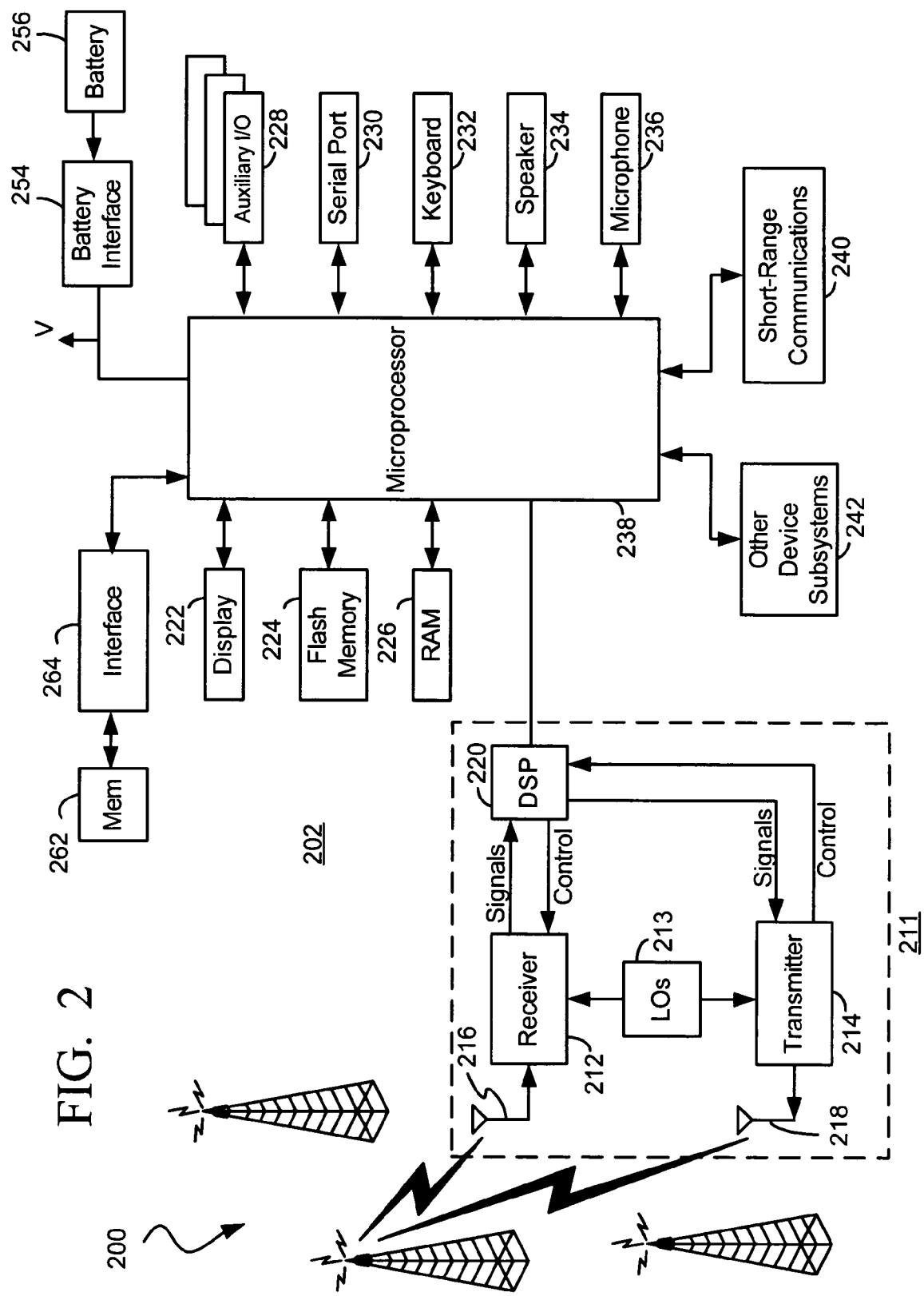
FIG. 2 is a more detailed diagram of a preferred mobile station of FIG. 1.

FIG. 2 is a detailed block diagram of a preferred mobile station 202 of the present application. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as a network reestablishment scheme of the present application, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
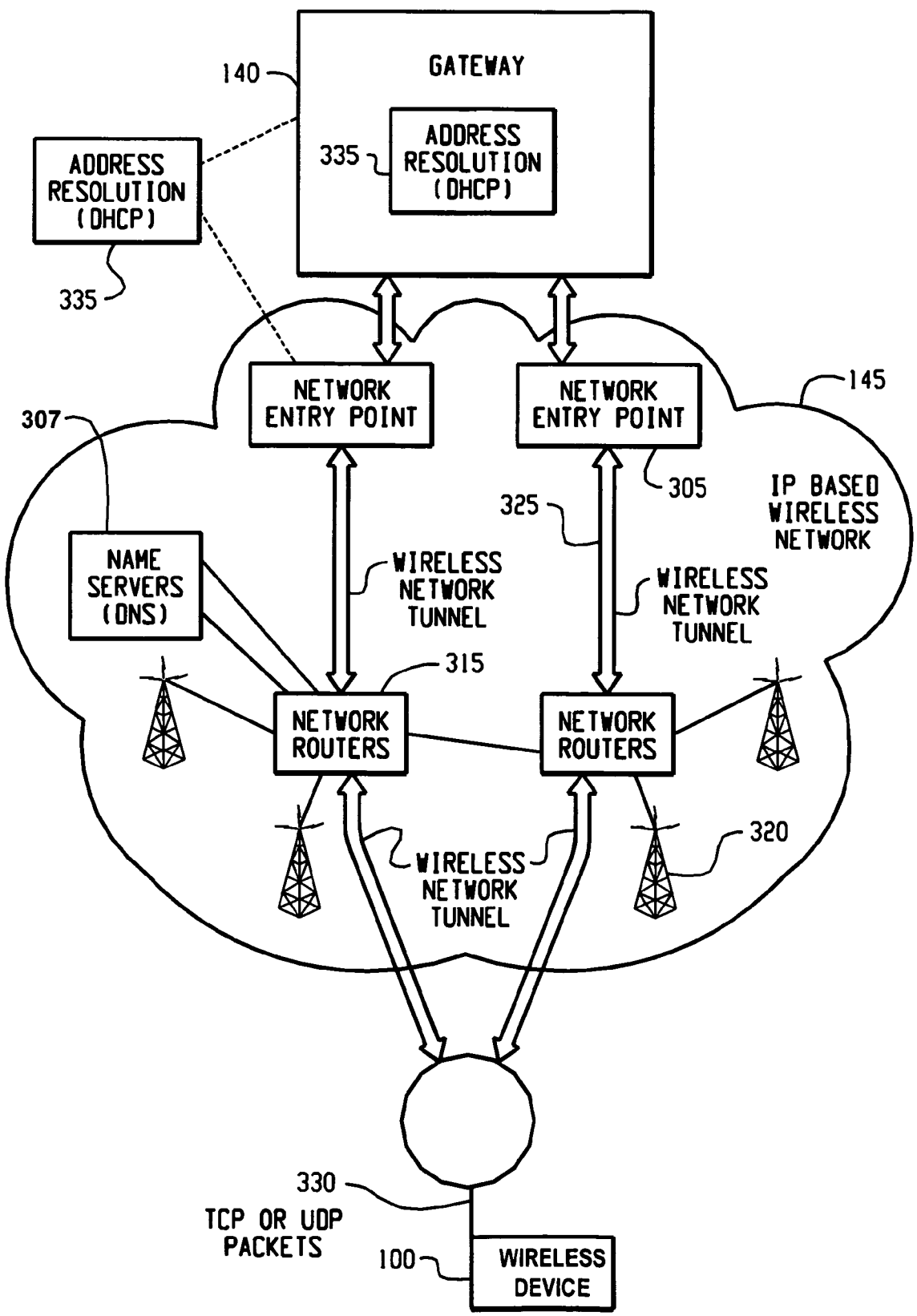
FIG. 3 is a particular system diagram for the mobile station and wireless network of FIGS. 1 and 2.

FIG. 3 shows a particular system structure for communicating with a mobile station. In particular, FIG. 3 shows basic components of an IP-based wireless data network which may be utilized. A mobile station 100 communicates with a wireless packet data network 145, and may also be capable of communicating with a wireless voice network (not shown). As shown in FIG. 3, a gateway 140 may be coupled to an internal or external address resolution component 335 and one or more network entry points 305. Data packets are transmitted from gateway 140, which is source of information to be transmitted to mobile station 100, through network 145 by setting up a wireless network tunnel 325 from gateway 140 to mobile station 100. In order to create this wireless tunnel 325, a unique network address is associated with mobile station 100. In an IP-based wireless network, however, network addresses are typically not permanently assigned to a particular mobile station 100 but instead are dynamically allocated on an as-needed basis. It is thus preferable for mobile station 100 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile stations such as mobile station 100.

Wireless network tunnels such as a wireless tunnel 325 are opened across wireless network 345 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile station 100 must use a specific technique associated with wireless network 345. The step of opening such a wireless tunnel 325 may require mobile station 100 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 100. When an IP address has been allocated to mobile station 100 and communicated to gateway 140, information can then be forwarded from gateway 140 to mobile station 100.

Wireless tunnel 325 typically has a limited life, depending on mobile station's 100 coverage profile and activity. Wireless network 145 will tear down wireless tunnel 325 after a certain period of inactivity or out-of-coverage period, in order to recapture resources held by this wireless tunnel 325 for other users. The main reason for this is to reclaim the IP address temporarily reserved for mobile station 100 when wireless tunnel 325 was first opened. Once the IP address is lost and wireless tunnel 325 is torn down, gateway 140 loses all ability to initiate IP data packets to mobile station 100, whether over Transmission Control Protocol (TCP) or over User Datagram Protocol (UDP).

A PDP Context is generally a logical association between a mobile station and a data network across a GPRS network. A PDP context defines aspects such as routing, Quality of Service (QoS), security, billing, etc. In order for the end user to be able to transfer data, a PDP Context must be activated in the mobile station, SGSN, and GGSN. The user or mobile station may initiate this procedure, which is similar to logging on to a required destination network. A traditional procedure for obtaining a PDP Context is now described. The user or application of the mobile station initiates the logging on process. In doing this, the mobile station requests sufficient radio resources to support the Context Activation procedure. Once the radio resources are allocated, the mobile station sends an Activate PDP Context request to the SGSN. This signaling message includes key information about the static IP address of the mobile station (if applicable), the QoS requested for this context, the APN of the external network to which connectivity is requested, the user's identity, and any necessary IP configuration parameters (e.g. for security reasons). After receiving the Activate PDP Context message, the SGSN checks the user's subscription record to establish whether the request is valid. If the request is valid, the SGSN sends a query containing a requested Access Point Name (APN) to a Domain Name Server (DNS) server. The DNS server uses the APN to determine the IP address of at least one GGSN that will provide the required connectivity to the external network. The GGSN IP address is then returned to the SGSN. The SGSN uses the GGSN IP address to request a connection tunnel to the GGSN. Upon receiving this request, the GGSN completes the establishment of the tunnel and returns an IP address to be conveyed to the mobile station. The GGSN associates the tunnel with the required external network connection. Once this procedure is completed, a virtual connection is established between the mobile station and the GGSN. The GGSN also has an association between the tunnel and the physical interface to the external network. Data transfer can now take place between the mobile station and the external network.

Advantageously, a technique is provided herein for efficiently establishing and maintaining the PDP Context between the mobile station and the wireless network. Broadly, the technique involves a plurality of retries with a "backoff mechanism" for establishing or reestablishing the PDP Context. With the backoff mechanism, the delay time after which each PDP Context retry is attempted is repeated increased until a suitable fixed delay time is reached. Thus, the PDP Context retries are much faster initially than they are later on assuming the attempts continue to be unsuccessful. This way, an end user may not perceive a long delay in the reestablishment of the data connection in the event that the PDP Context failure was short and temporary. Upon identification of a change in wireless networks, the technique is reset or restarted such that the delay time is again initialized to the lowest value and increased accordingly over time.

Specifically, the method for use in efficiently establishing a PDP Context between the mobile station and the wireless network includes the steps of causing at least one PDP Context request to be transmitted to the wireless network in attempt to establish PDP Context between the mobile station and the wireless network; setting a delay timer to an initial value and running the delay timer; if the PDP Context has not been established in response to transmitting the at least one PDP Context request, causing at least one subsequent PDP Context request to be transmitted after expiration of the delay timer set to the initial value; setting the delay timer to a subsequent initial value which is greater than the initial value and running the delay timer; and if the PDP Context has not been established in response to transmitting the at least one subsequent PDP Context request, causing at least one other subsequent PDP Context request to be transmitted after expiration of the delay timer set to the subsequent initial value. The method may continue by setting the delay timer to another subsequent initial value greater than the subsequent initial value and running the delay timer; and if the PDP Context has not been established in response to transmitting the at least one other subsequent PDP Context request, causing at least one additional subsequent PDP Context request to be transmitted after expiration of the delay timer set to the another subsequent initial value.

As apparent, the technique continues until the PDP Context is established with the wireless network, if at all, or until a suitable fixed delay time value is reached. If a new wireless network is selected during operation, the technique is reset such that the first initial value (i.e. the smallest value) is again utilized for the delay timer and increased accordingly over time. Preferably, the technique works in combination with relatively more quick retries attempted in the lower radio layer(s) (i.e. the physical, data link, or network layer). Thus, each PDP Context retry may comprise a plurality of PDP Context retries which are performed much closer together in time than the above-described attempts.

Figure 4:
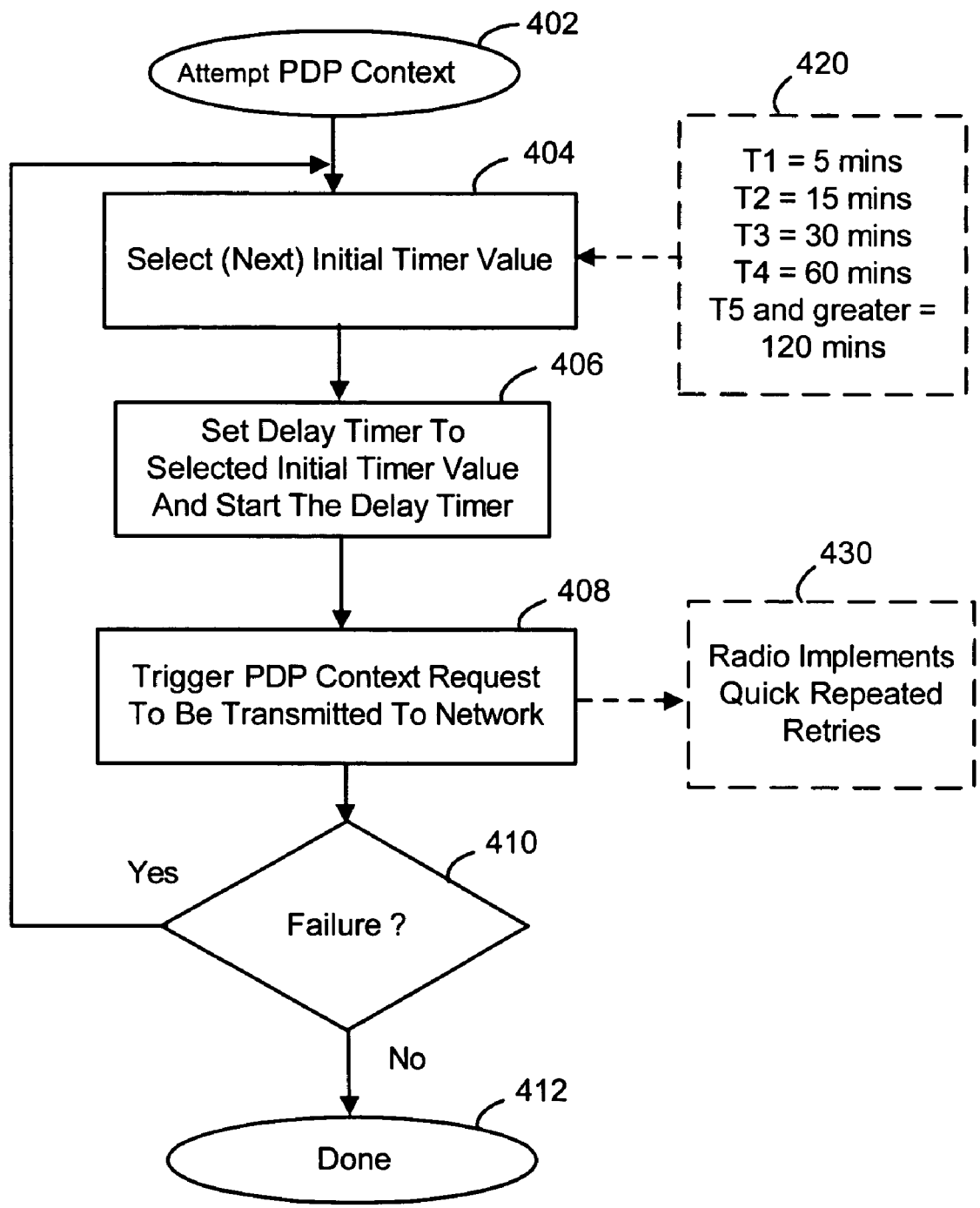
FIG. 4 is a flowchart which describes a method for use in efficiently establishing and maintaining a data connection of the present application.

FIG. 4 is a flowchart for describing a method for use in efficiently establishing and maintaining a data connection such as a PDP Context between a mobile station and a wireless network. The method described is performed by and within the mobile station. A computer program product of the present application includes a storage medium and computer instructions stored in the storage medium which are executable by one or more processors of the mobile station. Note that although the following description relates to PDP Contexts of a GSM/GPRS network, the technique is also applicable to other networks such as a CDMA network which have Point-to-Point Protocol (PPP) sessions, for example.

The flowchart of FIG. 4 illustrates a routine to be called for "getting a PDP Context" for the mobile station. This routine is called when a data application of the mobile station is opened, when the mobile station is powered on, or when the mobile station changes the wireless network in which it is operating. Beginning at a start block 402, an initial timer value is selected (step 404). This initial timer value will be selected from one of a plurality of initial timer values of a table 420 which is stored in memory, or calculated based on a simple equation, as examples. A delay timer is then set to the selected initial value from step 402, and the delay timer is started or caused to run (step 406). The first time step 404 is performed, the selected timer value is T1. The next time step 404 is performed, the selected timer value is T2. The next time step 404 is performed, the selected timer value is T3, then T4, then T5, and so on. Note that the initial timer values (e.g. from T1 through T5) generally increase in value for each subsequent request. Preferably, there comes a point where the selected timer value becomes fixed for each subsequent request, say at T5. So for all subsequent times that step 404 is performed once T5 is utilized, the selected timer value remains at T5. As shown in table 420 of FIG. 4, examples for the initial timer values are T1=5 minutes, T2=15 minutes, T3=30 minutes, T4=60 minutes, and T5=120 minutes. Again, these values are merely examples and any other suitable values may be utilized. Also, although five (5) different initial timer values are described, any suitable number of timer values may be utilized. Preferably, at least some of the initial timer values are stored in programmable memory of the mobile station and are configurable.

Next in step 408, a PDP Context request is caused to be transmitted to the wireless network (step 408). If the PDP Context is a success as identified in step 410, then the PDP Context has been established and the process is done (step 412). If the PPD Context fails as identified in step 410, however, the technique repeats starting again at step 404 where a new initial timer value is selected. The PDP Context failure may be identified in step 410 by receiving an error message from the wireless network, or upon expiration of a timer when no PDP Context confirmation is received. The technique continues until the PDP Context is established with the wireless network, if at all, or until a suitable fixed delay time value (e.g. T5) is reached.

If a new wireless network is selected during operation, the technique is reset (i.e. the "Attempt PDP Context" routine of FIG. 4 is called again) such that the first initial value (i.e. the smallest value or T1) is again utilized for the delay timer and increased accordingly over time (T1, T2, T3, etc.). Therefore if no PDP Context is established and a new wireless network is selected for operation, the PDP Context retries will increase in frequency until the PDP Context is established, if at all.

Figure 5:
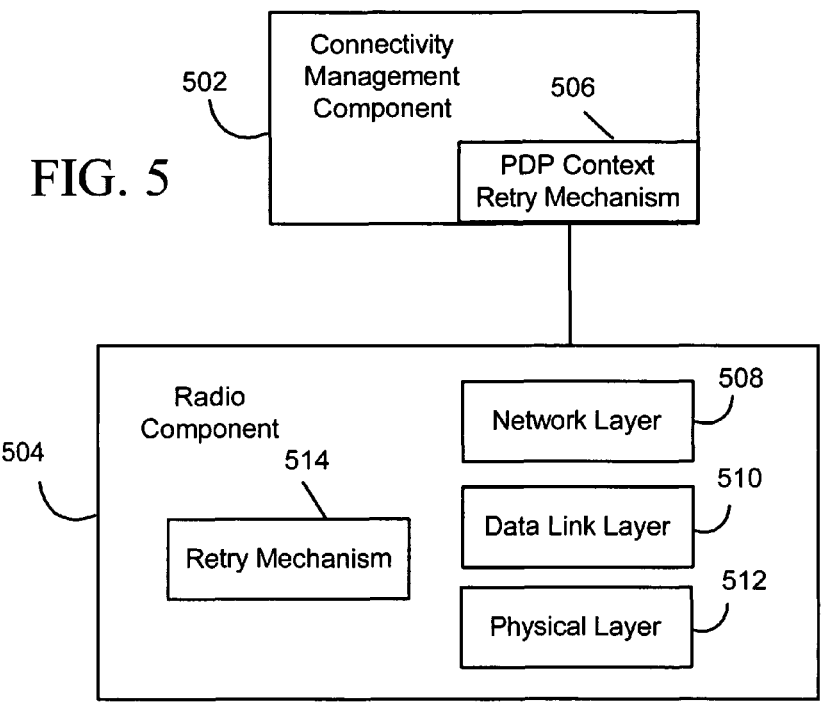
FIG. 5 is a simple block diagram of a retry mechanism which may be operative to execute the method of FIG. 4 and interface with a radio portion of the mobile station.

Preferably, the technique may work in combination with relatively more quick retries attempted in the lower radio layer(s) (i.e. the physical, data link, or network layer). To illustrate, FIG. 5 is a simple block diagram which illustrates pertinent software/hardware components of the present application for performing the method of FIG. 4. A connectivity management component 502 includes a PDP Context Retry Mechanism ("retry mechanism") 506 which is adapted to perform the method of FIG. 4. Component 502 interfaces with a radio component 504 which handles processes related to several "radio" layers of the mobile station which may include a physical layer 512, a data link layer 510, and a network layer 508. Thus, retry mechanism 506 is part of a processing layer which is higher than a network layer process of the mobile station.

Note that retry mechanism 506 is not included in radio component 504. Radio component 504 includes its own retry mechanism 514 which causes a plurality of retry attempts for a PDP Context, but these retries are closely spaced apart relative to the spacing of the retries of retry mechanism 506. The retries of retry mechanism 514 are also set apart by a fixed delay time. For example, retry mechanism 514 may provide for five (5) retries with a fixed delay time of 30 seconds between each retry. Note that retry mechanism 506 and retry mechanism 514 generally operate independently of one another.

Figure 6:
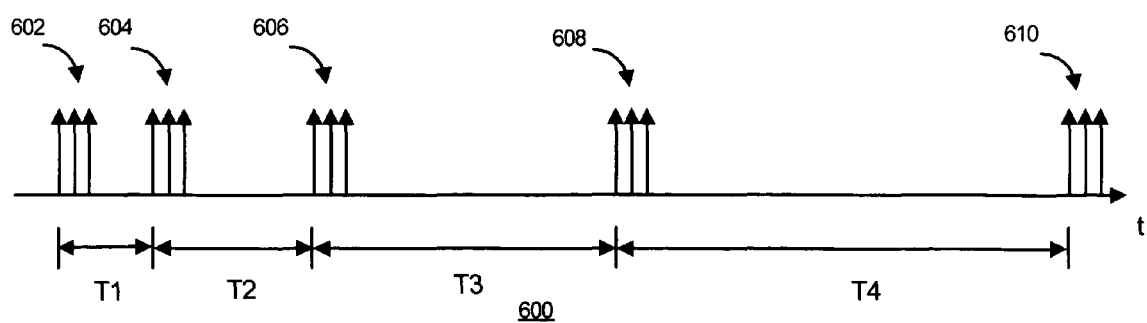
FIG. 6 is a timing diagram which visually illustrates the data connection retries of the present application.

See further FIG. 6, which is a timing diagram 600 of PDP Context retries from the mobile station when a PDP Context continues to fail. FIG. 6 shows the retries of both retry mechanism 506 and retry mechanism 514 of radio component 504. In FIG. 6, a retry 502 is shown, followed by a retry 604 after a delay time of T1, which is followed by a retry 606 after a delay time T2, which is followed by a retry 608 after a delay time T3, which is followed by a retry 610 after a delay time T4, etc. Retry mechanism 506 generally causes retries 602, 604, 606, 608, and 610 to be performed. As illustrated, each retry 602, 604, 606, 608, and 610 may include a plurality of retries (e.g. three (3) which are shown in FIG. 6) which are performed by retry mechanism 514 and closely spaced together relative to the spacing of the others.

The separation of functionality of retry mechanism 506 from retry mechanism 514 is important and advantageous. In general, complex techniques for maintaining an "always-on" connection may be designed and implemented in the radio component (radio layers) of the mobile station. In some cases, however, it is not possible to have control over the design or implementation of the radio component. For example, radio component 504 of FIG. 5 may be a traditional cellular radio interface which was not designed for reliable data connectivity or for an "always-on" mobile station. In this case, only a communication interface to radio component 504 is possible. Using techniques of the present application, reliable and efficient "always-on" capability may be provided in such an architecture.

In an alternative embodiment, radio component 504 does not include retry mechanism 514, but rather retry mechanism 506 of connectivity management component 502 incorporates the functionality of retry mechanism 514 of radio component 504. In this case, retry mechanism 506 of connectivity management portion 502 implements all of the retries shown in FIG. 6 (i.e. both the short fixed time retries as well as the longer variable time retries). Therefore, step 430 of FIG. 4 is not implemented in the radio but rather incorporated in the loop of the flowchart. In yet another alternative embodiment, connectivity management component 502 does not include retry mechanism 506, but rather retry mechanism 514 of radio component 504 incorporates the functionality of retry mechanism 506 of connectivity management component 502. In this case, retry mechanism 514 of radio component 504 implements all of the retries shown in FIG. 6 (i.e. both the short fixed time retries as well as the longer variable time retries).

Thus, methods and apparatus for use in efficiently establishing and maintaining a data connection, such as a Packet Data Protocol (PDP) Context, between a mobile station and a wireless communication network have been described. It is important to maintain a reliable "always-on" connection for data communication without burdening the network. One illustrative method includes the steps of causing at least one data connection request to be transmitted to the wireless network in attempt to establish a data connection between the mobile station and the wireless network; setting a delay timer to an initial value and running the delay timer; if the data connection has not been established in response to transmitting the at least one data connection request, causing at least one subsequent data connection request to be transmitted after expiration of the delay timer set to the initial value; setting the delay timer to a subsequent initial value which is greater than the initial value and running the delay timer; and if the data connection has not been established in response to transmitting the at least one subsequent data connection request, causing at least one other subsequent data connection request to be transmitted after expiration of the delay timer set to the subsequent initial value. The method may continue by setting the delay timer to another subsequent initial value greater than the subsequent initial value and running the delay timer; and if the data connection has not been established in response to transmitting the at least one other subsequent data connection request, causing at least one additional subsequent data connection request to be transmitted after expiration of the delay timer set to the another subsequent initial value.

This technique continues until the data connection is established with the wireless network, if at all. If a new wireless network is selected during the technique, the process is reset such that the first initial value is again utilized first for the delay timer. Preferably, the technique works in combination with relatively more quick retries implemented in lower radio layer(s) (i.e. the physical, data link, or network layer). Thus, each data connection request may be a plurality of data connection retries which are performed much closer together in time than the above-described attempts.

A mobile station of the present application includes a wireless transceiver, an antenna coupled to the wireless transceiver, and one or more processors coupled to the wireless transceiver which are operative to: cause at least one data connection request to be transmitted through the wireless transceiver in attempt to establish a data connection between the mobile station and the wireless network; set a delay timer to an initial value and run the delay timer; if the data connection has not been established in response to transmitting the at least one data connection request, cause at least one subsequent data connection request to be transmitted through the wireless transceiver after expiration of the delay timer set to the initial value; set the delay timer to a subsequent initial value which is greater than the initial value and run the delay timer; and if the data connection has not been established in response to transmitting the at least one subsequent data connection request, cause at least one other subsequent data connection request to be transmitted through the wireless transceiver after expiration of the delay timer set with the subsequent initial value.

A computer program product of the present application includes a storage medium and computer instructions stored in the storage medium which are executable by one or more processors of a mobile communication device for use in establishing a data connection between the mobile device and a wireless communication network by causing at least one data connection request to be transmitted in attempt to establish a data connection between the mobile device and the wireless network; setting a delay timer to an initial value and running the delay timer; if the data connection has not been established in response to transmitting the at least one data connection request, causing at least one subsequent data connection request to be transmitted after expiration of the delay timer set to the initial value; setting the delay timer to a subsequent initial value which is greater than the initial value and running the delay timer; and if the data connection has not been established in response to transmitting the at least one subsequent data connection request, causing at least one other subsequent data connection request to be transmitted after expiration of the delay timer set to the subsequent initial value.

The above-described embodiments of the present application are intended to be examples only. For example, although the present application describes a technique applicable to a GSM/GPRS network for PDP Contexts, the technique is also applicable to other networks such as a CDMA network for Point-to-Point Protocol (PPP) sessions. Those of skill in the art may effect alterations, modifications and variations to the particular embodiments without departing from the scope of the application. The invention described herein in the recited claims intends to cover and embrace all suitable changes in technology.

What is claimed is:

1. A method in a data connectivity management component for use in establishing, via a wireless communication network, a data session for packet data communications for a data application of a mobile communication device, the mobile device including the data connectivity management component and a radio component separate from the data connectivity management component, the method comprising the acts of:

sending, from the data connectivity management component to the radio component, a data connection request for transmission from the radio component to the wireless network in attempt to establish the data session for the mobile device, the transmission of the data connection request being retried a plurality of times by the radio component independently if the data session has not been established in response to the data connection request;

setting, by the data connectivity management component, a delay timer to an initial value and running the delay timer;

if, prior to expiration of the delay timer set to the initial value, the data session is established in response to transmitting the data connection request or the corresponding retries, then communicating packet data via the wireless network for the packet data communications of the data session;

if, upon expiration of the delay timer set to the initial value, the data session has not been established in response to transmitting the data connection request and corresponding retries, then:

after the data connection request and corresponding retries by the radio component have been transmitted, sending, from the data connectivity management component to the radio component, a subsequent data connection request for transmission from the radio component to the wireless network in further attempt to establish the data session, the transmission of the subsequent data connection request being retried a plurality of times by the radio component independently if the data session has not been established in response to the subsequent data connection request;

setting, by the data connectivity management component, the delay timer to a subsequent initial value which is greater than the initial value and running the delay timer;

if, prior to expiration of the delay timer set to the subsequent initial value, the data session is established in response to transmitting the subsequent data connection request or corresponding retries, then communicating packet data via the wireless network for the packet data communications of the data session; and if, upon expiration of the delay timer set to the subsequent initial value, the data session has not been established in response to transmitting the subsequent data connection request and corresponding retries, then:

after the subsequent data connection request and the corresponding retries have been transmitted, sending, from the data connectivity management component to the radio component, another subsequent data connection request for transmission from the radio component to the wireless network in further attempt to establish the data session, the transmission of the other subsequent data connection request being retried a plurality of times by the radio component independently if the data session has not been established in response to the other subsequent data connection request.

2. The method of claim 1, further comprising:

if, upon expiration of the delay timer set to the subsequent initial value, the data session has not been established in response to transmitting the subsequent data connection request and the corresponding retries, then:

setting, by the data connectivity management component, the delay timer to another subsequent initial value greater than the subsequent initial value and running the delay timer;

if, prior to expiration of the delay timer set to the other subsequent initial value, the data session is established in response to transmitting the other subsequent data connection request or the corresponding retries, then communicating packet data via the wireless network for the packet data communications of the data session; and if, upon expiration of the delay timer set to the other subsequent initial value, the data session has not been established in response to transmitting the other subsequent data connection request and corresponding retries, then:

after the other subsequent data connection request and corresponding retries have been transmitted, sending, from the data connectivity management component to the radio component, an additional subsequent data connection request for transmission from the radio component to the wireless network in further attempt to establish the data session, the transmission of the additional subsequent data connection request being retried a plurality of times by the radio component independently if the data session has not been established in response to the additional subsequent data connection request.

3. The method of claim 1, wherein the radio component comprises a cellular radio interface.

4. The method of claim 1, wherein the data connection request comprises a Packet Data Protocol (PDP) Context request for establishing a PDP Context for the data session.

5. The method of claim 1, wherein the data connection request comprises a Point to Point Protocol (PPP) session request and the data session is a PPP session.

6. The method of claim 1, wherein each data connection request is retried by the radio component upon failure as a plurality of data connection requests, and a predetermined delay period exists between transmission of the retried data connection requests.

7. The method of claim 1, wherein the radio component comprises at least one of a physical layer process, a data link layer process, or a network layer process, and the data connectivity management component comprises a layer process that is higher than the network layer process.

8. A mobile station, comprising:

a radio component which includes a wireless transceiver operative to communicate with a wireless communication network;

one or more processors having a data connectivity management component which is separate from the radio component, the data connectivity management component being operative to:

send, to the radio component, a data connection request for transmission from the radio component to the wireless network in attempt to establish a data session for packet data communications for a data application of the mobile station, the transmission of the data connection request being retried a plurality of times by the radio component independently if the data session has not been established in response to the data connection request;

set a delay timer to an initial value and run the delay timer;

if, prior to expiration of the delay timer set to the initial value, the data session is established in response to transmitting the data connection request or corresponding retries, then communicate packet data via the wireless network for the packet data communications of the data session;

if, upon expiration of the delay timer set to the initial value, the data session has not been established in response to transmitting the data connection request and corresponding retries, then:

after the data connection request and corresponding retries have been transmitted, send, to the radio component, a subsequent data connection request for transmission from the radio component to the wireless network in attempt to establish the data session, the transmission of the subsequent data connection request being retried a plurality of times by the radio component independently if the data session has not been established in response to the subsequent data connection request;

set the delay timer to a subsequent initial value which is greater than the initial value and run the delay timer;

if, prior to expiration of the delay timer set to the subsequent initial value, the data session is established in response to transmitting the subsequent data connection request or corresponding retries, then communicate packet data via the wireless network for the packet data communications of the data session; and if, upon expiration of the delay timer set to the subsequent initial value, the data session has not been established in response to transmitting the subsequent data connection request and corresponding retries, then:

after the subsequent data connection request and corresponding retries have been transmitted, send, to the radio component, another subsequent data connection request for transmission from the radio component in attempt to establish the data session, the transmission of the other subsequent data connection request being retried a plurality of times by the radio component independently if the data session has not been established in response to the other subsequent data connection request.

9. The mobile station of claim 8, wherein the data connectivity management component is further configured to:

if, upon expiration of the delay timer set to the subsequent initial value, the data session has not been established in response to transmitting the subsequent data connection request and corresponding retries, then:
set the delay timer to another subsequent initial value greater than the subsequent initial value and run the delay timer;
if, prior to expiration of the delay timer set to the other subsequent initial value, the data session is established in response to transmitting the other subsequent data connection request or corresponding retries, then communicate packet data to the wireless network for the packet data communications of the data session; and
if, upon expiration of the delay timer set to the other subsequent initial value, the data session has not been established in response to transmitting the other subsequent data connection request and corresponding retries, then:
after the other subsequent data connection request and corresponding retries have been transmitted, send, to the radio component, an additional subsequent data connection request for transmission from the radio component to the wireless network in attempt to establish the data session, the transmission of the additional subsequent data connection request being retried a plurality of times by the radio component independently if the data session has not been established in response to the additional subsequent data connection request.

10. The mobile station of claim 8, wherein the radio component comprises a cellular radio interface of the mobile station.

11. The mobile station of claim 8, wherein the data connection request comprises a Packet Data Protocol (PDP) Context request for establishing a PDP Context for the data session.

12. The mobile station of claim 8, wherein the data connection request comprises a Point to Point Protocol (PPP) request and the data session is a PPP session.

13. The mobile station of claim 8, wherein the radio component comprises at least one of a physical layer process, a data link layer process, or a network layer process in the mobile station, and the data connectivity management component comprises a layer process that is higher than the network layer process in the mobile station.

14. The mobile station of claim 8, wherein the the data connectivity management component and the radio component are separate components in the mobile station, and the radio component comprises a cellular radio interface of the mobile station.

15. The mobile station of claim 8, wherein the one or more processors are operative to perform the recited acts in a layer process which is higher than a network layer process of the radio component.

16. A computer program product, comprising:
a storage medium;
computer instructions stored in the storage medium; and
the computer instructions being executable by one or more processors of a mobile communication device in a data connectivity management component which is separate from a radio component of the mobile device, the computer instructions being executable for use in establishing, via a wireless communication network, a data session for packet data communications for a data application of the mobile device by:
sending, from the data connectivity management component to the radio component, a data connection request for transmission from the radio component to the wireless network in attempt to establish the data session for the mobile device, the transmission of the data connection request being retried a plurality of times by the radio component independently if the data session has not been established in response to the data connection request;
setting, by the data connectivity management component, a delay timer to an initial value and running the delay timer;
if, prior to expiration of the delay timer set to the initial value, the data session is established in response to transmitting the data connection request or corresponding retries, then communicating packet data via the wireless network for the packet data communications of the data session;
if, upon expiration of the delay timer set to the initial value, the data session has not been established in response to transmitting the data connection request and corresponding retries, then:
after the data connection request and corresponding retries have been transmitted, sending, from the data connectivity management component to the radio component, a subsequent data connection request for transmission from the radio component to the wireless network in further attempt to establish the data session, the transmission of subsequent data connection request being retried a plurality of times by the radio component independently if the data session has not been established in response to the subsequent data connection request;
setting, by the data connectivity management component, the delay timer to a subsequent initial value which is greater than the initial value and running the delay timer;
if, prior to expiration of the delay timer set to the subsequent initial value, the data session is established in response to transmitting the subsequent data connection request or corresponding retries, then communicating packet data via the wireless network for the packet data communications of the data session; and
if, upon expiration of the delay timer set to the subsequent initial value, the data session has not been established in response to transmitting the subsequent data connection request and corresponding retries, then:
after the subsequent data connection request and corresponding retries have been transmitted, sending, from the data connectivity management component to the radio component, another subsequent data connection request for transmission from the radio component to the wireless network in further attempt to establish the data session, the transmission of the other data connection request being retried a plurality of times by the radio component independently if the data session has not been established in response to the other data connection request.

17. The computer program product of claim 16, wherein the computer instructions are further executable for:
if, upon expiration of the delay timer set to the subsequent initial value, the data session has not been established in response to transmitting the subsequent data connection request and corresponding retries, then:
setting, by the computer instructions, the delay timer to another subsequent initial value greater than the subsequent initial value and running the delay timer;
if, prior to expiration of the delay timer set to the other subsequent initial value, the data session is established in response to transmitting the other subsequent data connection request or corresponding retries, then communicating packet data to the wireless network for the packet data communications of the data session; and if, upon expiration of the delay timer set to the other subsequent initial value, the data session has not been established in response to transmitting the other subsequent data connection request and corresponding retries, then:

after the other subsequent data connection request and corresponding retries have been transmitted, sending, from the data connectivity management component to the radio component, an additional subsequent data connection request for transmission from the radio component to the wireless network in further attempt to establish the data session, the transmission of the additional subsequent data connection request being retried a plurality of times by the radio component independently if the data session has not been established in response to the additional subsequent data connection request.

18. The computer program product of claim 16, wherein the radio component comprises a cellular radio interface of the mobile station.

19. The computer program product of claim 16, wherein the data connection request comprises a Packet Data Protocol (PDP) Context request for establishing a PDP Context for the data session.

20. The computer program product of claim 16, wherein the data connection request comprises a Point-to-Point Protocol (PPP) session request and the data session is a PPP session.

21. The computer program product of claim 16, wherein the radio component comprises at least one of a physical layer process, a data link layer process, or a network layer process, and the data connectivity management component comprises a layer process of the computer instructions that is higher than the network layer process.

22. The computer program product of claim 16, wherein the computer instructions are part of a layer process which is higher than a network layer process of the mobile device.

23. A processing component for a mobile communication device, the processing component being separate from but configured to interface with a wireless radio component in the mobile device for establishing a data session for packet data communications for a data application of the mobile device via a wireless communication network, the processing component being configured to:

send, from the processing component to the wireless radio component, a data connection request for transmission from the wireless radio component to the wireless network in attempt to establish the data session for the mobile device, where transmission of the data connection request is retried a plurality of times by the wireless radio component independently if the data session has not been established in response to the data connection request;

set, by the processing component, a delay timer to an initial value and run the delay timer;

if, prior to expiration of the delay timer set to the initial value, the data session is established in response to transmitting the data connection request or corresponding retries, then communicate packet data to the wireless network for the packet data communications of the data session;

if, upon expiration of the delay timer set to the initial value, the data session has not been established in response to transmitting the data connection request and corresponding retries, then:

after the subsequent data connection request and the corresponding retries have been transmitted, send, from the processing component to the wireless radio component, a subsequent data connection request for transmission from the wireless radio component to the wireless network in further attempt to establish the data session, where transmission of the subsequent data connection request is retried a plurality of times by the wireless radio component independently if the data session has not been established in response to the subsequent data connection request;

set, by the processing component, the delay timer to a subsequent initial value which is greater than the initial value and run the delay timer;

if, prior to expiration of the delay timer set to the subsequent initial value, the data session is established in response to transmitting the subsequent data connection request or corresponding retries, then communicate packet data via the wireless network for the packet data communications of the data session; and if, upon expiration of the delay timer set to the subsequent initial value, the data session has not been established in response to transmitting the subsequent data connection request and corresponding retries, then:

after the subsequent data connection request and the corresponding retries have been transmitted, send, from the processing component to the wireless radio component, another subsequent data connection request for transmission from the wireless radio component to the wireless network in further attempt to establish the data session, where transmission of the other subsequent data connection request is retried a plurality of times by the wireless radio component independently if the data session has not been established in response to the other subsequent data connection request.

24. The processing component of claim 23, wherein the data connection request comprises a Packet Data Protocol (PDP) Context request for establishing a PDP Context for the data session.

25. The processing component of claim 23, wherein the data connection request comprises a Point to Point Protocol (PPP) session request and the data session is a PPP session.

26. The processing component of claim 23, wherein the wireless radio component comprises a cellular radio interface of the mobile device.

27. The processing component of claim 23, wherein the wireless radio component comprises at least one of a physical layer process, a data link layer process, and a network layer process, and the data connectivity management component comprises a layer process that is higher than the network layer process.

* * * * *